United States Patent [19]

Rainbolt

[11] 4,291,248

[45] Sep. 22, 1981

[54] ELECTRIC MOTOR

[75] Inventor: Michael A. Rainbolt, Farmington, N. Mex.

[73] Assignee: Rainbolt Research, Inc., Farmington, N. Mex.

[21] Appl. No.: 972,984

[22] Filed: Dec. 26, 1978

[51] Int. Cl.³ ............................................. H02K 37/00
[52] U.S. Cl. ............................................ 310/14; 310/46
[58] Field of Search ........................ 310/12, 14, 46, 83

[56] References Cited

U.S. PATENT DOCUMENTS

| 741,325 | 10/1903 | Gibbs | 310/46 X |
| 3,665,227 | 5/1972 | Rusch | 310/46 |
| 3,983,426 | 9/1976 | Kilmer | 310/46 |
| 4,025,807 | 5/1977 | Clover | 310/46 |
| 4,214,178 | 7/1980 | Tippner | 310/14 |

Primary Examiner—Donovan F. Duggan
Attorney, Agent, or Firm—Harvey B. Jacobson

[57] ABSTRACT

An electric motor having exceedingly high efficiencies includes three induction coils equally disposed about a circular path, a toroidally-shaped armature is disposed within the induction coils. The armature has a non-magnetic segment placed therein, thereby creating a pair of poles. Gear means are disposed within the armature and are operatively coupled thereto to provide mechanical output energy. The motor is driven by sequentially connecting a D.C. voltage to each of the three induction coils for a prescribed time.

7 Claims, 6 Drawing Figures

ELECTRIC MOTOR

BACKGROUND OF THE INVENTION

1. Field of the Invention

The present invention relates to an electric motor, and in particular, to an efficient electric motor suitable for driving light loads.

2. Description of the Prior Art

The prior art abounds with numerous types of electric motors, each design attempting to improve the efficiency of operation. Typical of these motors is the one disclosed in U.S. Pat. No. 517,858 issued on Apr. 10, 1894 to E. T. Greenfield. Greenfield discloses an electric motor having an annular armature or core made up of sections alternately of magnetic and non-magnetic materials; a series of solenoids surrounding the core connected in combination with the circuit brushes serves to close the circuit between the core and solenoids and power transmitting devices, such as friction wheels driven by the core. The core or armature disclosed is fabricated from a plurality of magnetic and non-magnetic materials, and is not limited to a singular magnetic armature with only a small portion thereof fabricated of non-magnetic materials. The power take-off arrangement, although similar to that disclosed in the present invention, does not provide for a means of centering the core within the solenoids as does the present invention.

Another type of electric motor is disclosed in U.S. Pat. No. 1,231,193 issued on June 26, 1917 to C. C. Powers. The motor disclosed therein includes a plurality of field coils equally spaced and circularly arranged, having an open or slit portion through which a plurality of spider arms radiate to a central hub. The extending spider arms are affixed to a plurality of magnetic sections alternately dispersed with non-magnetic sections in a circular arrangement, adapted to cooperate with and be inserted in a central portion of the field coils. The field coils herein must be wound in a unique manner providing for an opening or slit therein to enable the core to come in contact with the extending spider arms.

U.S. Pat. No. 1,068,531 issued to H. A. Rhodes on July 29, 1913 discloses an electric motor which includes a plurality of field coils mounted in a circular arrangement. A toroidal armature is adapted to rotate within the hollow portions of the field coils and is fabricated of a plurality of magnetic and non-magnetic materials. Here again, a plurality of field coils are required to operate in combination with an armature fabricated of a plurality of magnetic and non-magnetic materials.

Therefore, it is a primary object of the present invention to provide a small low power electric motor which is simple in construction, inexpensive to manufacture, easily repaired, and utilizes small amounts of energy.

SUMMARY OF THE INVENTION

The present invention overcomes the shortcomings found in the prior art by providing an electric motor which is easy to manufacture, inexpensive and is of high efficiency.

An electric motor, according to the principles of the present invention, comprises in combination; housing means, three induction coils equally disposed about a circular path and affixed to the housing forming a stator. A toroidally-shaped armature means is disposed within the induction coils, the armature means is a permanent magnet having a segment thereof of non-magnetic materials, the non-magnetic material is removably affixed therein and completes the toroid. Also included are gear means disposed within the armature means, and operatively coupled thereto by equally spaced rotatable members in contact therewith. The gear means includes an output shaft operatively coupled thereto. Additionally included are drive means which are sequentially connected to each of the coils for a time period equal to one-third of a cycle. Each of the coils are energized for one-sixth of a cycle by the magnetic pole of the armature passing therethrough.

BRIEF DESCRIPTION OF THE DRAWING

In order that the invention may be more fully understood, it will now be described by way of example, with reference to the accompanying drawing, in which.

DESCRIPTION OF THE PREFERRED EMBODIMENTS

Figure 1:
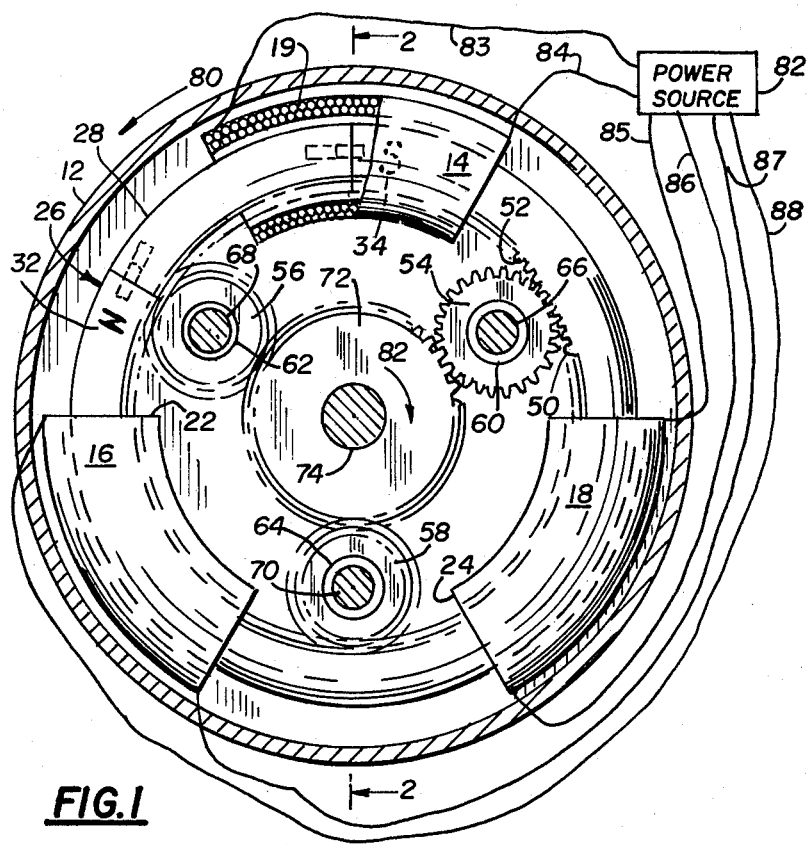
FIG. 1 is a side view in elevation, partially in cross section, of an electric motor according to the principles of the present invention.
Figure 2:
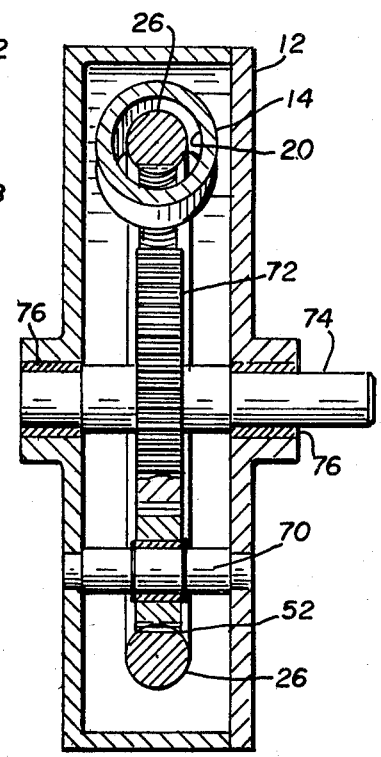
FIG. 2 is a cross sectional view in elevation taken along the line 2—2 of FIG. 1.
Figure 3:
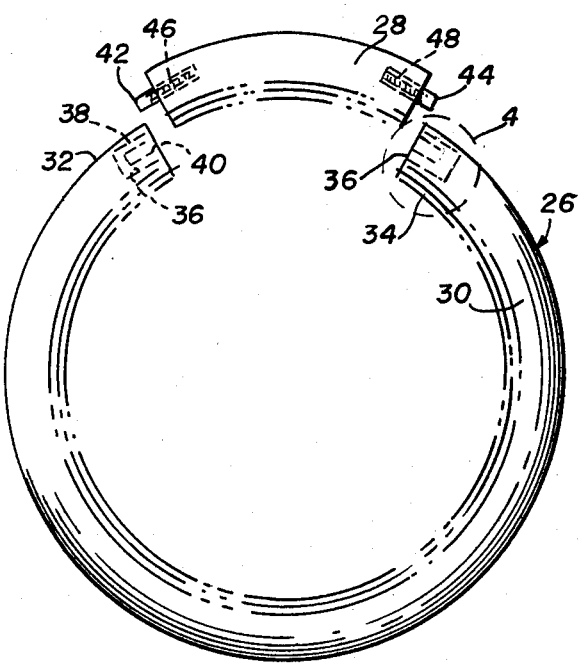
FIG. 3 is a plan view of an armature used in the preferred embodiment.
Figure 4:
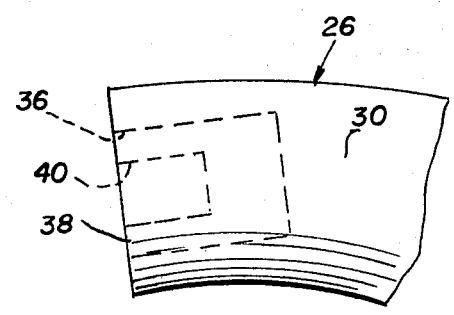
FIG. 4 is an enlarged view of the armature pole piece shown within the dotted line in FIG. 3.

Referring now to the drawings, and in particular to FIGS. 1 and 2 which disclose a motor according to the principles of the present invention. The motor includes a housing 12 on which is affixed, in a conventional manner, three induction coils 14, 16 and 18 which are identical. The coils 14, 16 and 18 are equally spaced about a circular path, proximate the circumference of the housing 12 and are provided with openings 20, 22 and 24 respectively, which are adapted to receive armature 26 therein. Coils 14, 16 and 18 are fabricated by winding a plurality of turns of wire 19 in a conventional manner. Armature 26 is fabricated of a magnetic material for approximately five-sixths (5/6) of its total length and is toroidally-shaped. The remaining portion 28 of the armature 26 is fabricated of a non-magnetic material and is shown more clearly in FIG. 3. The larger portion 30 of the armature 26 is permanently magnetized to form a permanent magnet having one pole occurring at one end 32 and an opposite pole occurring at the other end 34.

Both pole ends 32 and 34 are provided with an aperture 36 which is adapted to receive a non-magnetic plug insert 38 provided with a recess aperture 40. Aperture 40 is adapted to receive a spring-loaded pin 42 which is retained in the remaining portion 28 of the armature 26. Thus, by recessing pins 42 and 44 by applying pressure thereto against springs 46 and 48, respectively, the remaining portion 28 may be positioned in line with the larger portion 30 of the armature 26. When the remaining portion 28 is in position, the springs 46 and 48 will force pins 42 and 44 into aperture 40 provided in the plugs 38 inserted in both poles 32 and 34 occurring at the end of the larger portion 30 of the armature 26, thereby completing the shape of the toroid armature.

The remaining portion 28 provides a continuous smooth surface (provides a continuous inner circumferential surface of the armature 26). It is to be understood that this inner circumferential surface may be either smooth in nature or provided with gear teeth throughout as will be explained hereinafter, to provide continuous coupling to the output driving gears.

It is obvious from the construction of the armature that the remaining non-magnetic portion may be removed from the larger portion 30 by causing pins 42 and 44 to be compressed within the remaining portion so that it may be removed from the armature, should it become necessary.

In the preferred embodiment of the invention, the inner circumferential surface 50 of the armature 26 is provided with a plurality of gear teeth 52 adapted to intermesh with the teeth of spur gears 54, 56 and 58. Gears 54, 56 and 58 are provided with lubricated bushings 60, 62 and 64, respectively, which may be of the oilite type and are journaled on shafts 66, 68 and 70 which is mounted in housing 12.

Spur gears, 54, 56 and 58 intermesh with idler gear 72 which is provided with a centrally disposed output shaft 74 adapted to be journaled by means of bushings 76 provided in housing 12. Thus, rotation of the armature in the direction of arrow 80 will cause spur gears 54, 56 and 58 to rotate in the same direction. The rotation of gears 54, 56 and 58 in the direction of arrow 80 will cause the idler gear to rotate in the opposite direction as shown by arrow 82 which, of course, will be the same direction imparted to the output shaft 74.

The power source 82 is preferably electronic and includes silicon controlled rectifiers. The power source 82 is wired to each of the induction coils 14, 16 and 18 by means of lead wires 83 and 84; 85 and 86; and 87 and 88, as shown in FIG. 1. Although it is preferred that electronic means be used to distribute the D. C. voltage of the coils in proper time sequence, it is to be understood that mechanical means may also be utilized.

Figure 5:
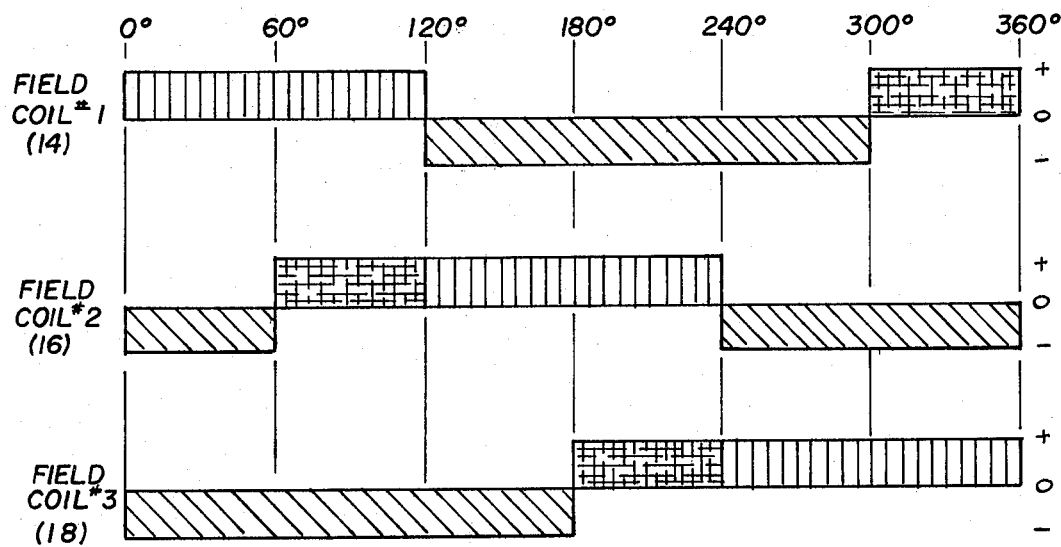
FIG. 5 is a time sequencing plot of the voltages appearing on each of the motor field coils.

Referring now to FIG. 5 which discloses the timing sequence of the application of voltage to each of the fields or induction coils 14, 16 and 18. Initially coil No. 1 (14) is energized by providing a voltage across lead wires 83 and and 84 with end 34 of armature 26 appearing at the left edge or exit of coil 14. The polarity of voltage and winding direction is such that it causes the end 34 of armature 26 to be driven in the direction of arrow 80 by the normal laws of physics causing like magnetic poles to repel each other. This continues for 120 degrees of rotation until the voltage applied to field coil No. 1 (14) from the power source is removed. However, at the 60 degree rotation point, field coil No. 2 (16) starts to be energized by the armature end 34 passing therethrough and causes a voltage to appear across lines 85 and 86 permitting the field to build up during the next 60 degrees of rotation. At the 120 degree rotation point, field coil No. 2 is energized with the pole piece 34 at the exit thereof causing it to be propelled in the direction of arrow 80. Field coil No. 3 (18) starts to be energized by armature end 34 passing therethrough and a voltage starts to appear across wires 87 and 88 at the 180 degree rotation point, thus allowing the field to build up in coil No. 3. At the 240 degree rotation point, coil No. 2 (16) is de-energized and field coil No. 3 (18) is energized with armature end 34 at the exit thereof, thus causing the armature 26 to be propelled further in the direction of arrow 80. Field coil No. 1 (14) is started to be re-energized by armature end 34 passing therethrough from the 300 degree point allowing it to build up again. The voltage is removed from the field coil No. 3 (18) at the 360 degree rotation point and transferred to coil No. 1 (14), thus repeating the cycle again as shown in FIG. 5. The frequency of rotation is only dependent upon the physical parameters and the ability of the coil to accept the rotation of the armature therein, and is controlled by the switching ability as set forth in the power source. The power source switching frequency may be designed in combination with the mechanical inertia of the armature so that any desirable frequency of operation may be obtained. It is understood that the mechanical inertia and ability to rotate the mass at very high speeds may be a limiting factor with regard to the highest speed obtainable in this type of device. The primary purpose of this type of construction is to yield a relatively low speed motor which may have a variable speed control associated therewith controlled by the power source 82, having variable switching speeds.

During the times that field coils 1, 2 and 3 are receiving no power from the power source, variations of the magnetic flux appearing therein will cause a voltage of opposite polarity to be generated, thereby restoring energy into the system, rather than taking energy from it and thus, increasing the overall system efficiency.

Figure 6:
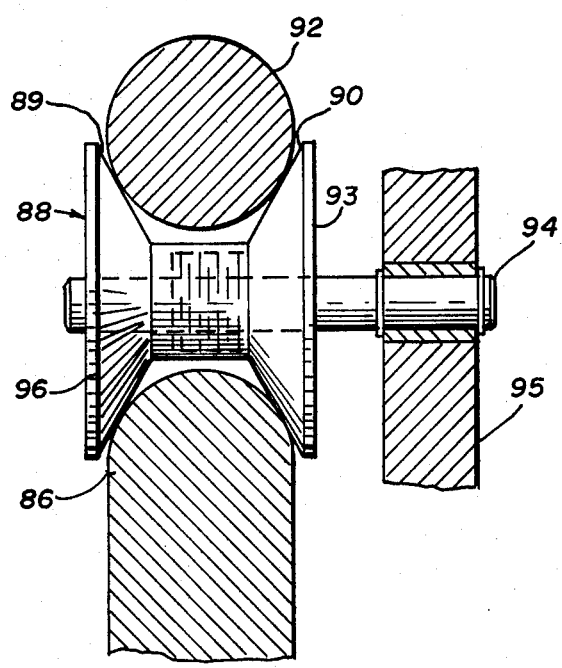
FIG. 6 is a greatly enlarged view of the gear driving means utilized in the alternate embodiment of the present invention.

An alternate embodiment of the present invention is shown in FIG. 6, wherein the output drive shaft, not shown, is provided with a circumferential flange 86 and an adjustable V-shaped gear 88 which is provided with two sloped walls 89 and 90. Sloped walls 89 and 90 are adapted to engage the circumferential flange 86 and the internal circumferential surface of the armature 92 which in this particular embodiment is not provided with gear teeth, but rather a smooth rounded surface for frictional engagement with the V-shaped notch provided in gear 88. Gear 88 is provided with a fixed portion 93 which is affixed, in a conventional manner to a shaft 94 adapted to be journaled in the housing 95. The movable portion 96 is threadedly engaged with the fixed portion 93 of the V-shaped gear 88. The configuration of the alternate embodiment shown in FIG. 6 is the same as that shown in FIG. 1. Thus, it is obvious that rotating the movable portion of gear 88 will change the relative contact diameter of the gear and thus, provides for centering of the armature within the induction coils, not shown. With this particular type of configuration the output shaft need not be provided with means for journaling in the housing since its position is movable and adjustable and depends on the centering of the armature and the adjustment of the relative frictional diameter in contact with the armature and the circumferential flange provided on the output shaft. This type of construction would be used for very light loads, such as slow speed fan operation where light loads are encountered.

It is obvious to those knowledgeable in the art that a plurality of induction coils with their associated armatures may be operatively coupled in tandem to a common output shaft to increase to output power from the motor.

Hereinbefore has been disclosed a low cost efficient electric motor which is reliable and very simple to manufacture. It will be understood that various changes in the detail, materials, arrangement of parts, and operating conditions which have been herein described and illustrated in order to explain the nature of the invention, may be made by those skilled in the art within the principles and scope of the present invention.

Having thus set forth the nature of the invention, what is claimed is:

1. An electromechanical energy conversion device comprising, in combination:
    (a) housing means;
    (b) three induction coils equally disposed about a circular path and affixed to said housing means forming a stator;
    (c) toroidally-shaped armature means disposed within said induction coils, said armature means including only one permanent magnet and a segment of non-magnetic material, said non-magnetic material comprising 60 degrees of said toroid with said permanent magnet comprising 300 degrees of said toroid;
    (d) gear means connected to said armature means by equally spaced rotatable members in contact therewith, said gear means including an output shaft operatively coupled thereto; and
    (e) timing and distribution means connected to each of said coils for a predetermined time period during each cycle.

2. An invention according to claim 1 wherein the inner circumferential surface of said armature means is provided with gear teeth adapted to intermesh with and drive said equally spaced rotatable members, said members being operatively coupled to said output shaft.

3. An invention according to claim 1 wherein said armature means frictionally engages said equally spaced rotatable members, said members being operatively coupled to said output shaft.

4. An invention according to claim 3 wherein said rotatable members are provided with adjustable V-shaped circumferential notches, said output shaft being provided with a circumferential flange comprising said gear means, said notches being adapted to engage said armature means and said output shaft circumferential flange for driving and centering said output shaft.

5. An invention according to claim 1 further including a plurality of said toroidally-shaped armature means and said induction coils mounted in tandem and operatively coupled to a common output shaft to increase the output power therefrom.

6. The invention according to claim 1 wherein said permanent magnet has poles which are oriented circumferentially of said armature means.

7. The invention according to claim 1 wherein said timing and distribution means includes sequential switching means for sequentially applying current to each of said coils.

* * * * *